(12) United States Patent
Singh et al.

(10) Patent No.: US 8,812,491 B2
(45) Date of Patent: Aug. 19, 2014

(54) OPTIMIZING QUERIES USING PREDICATE MAPPERS

(71) Applicant: International Business Machines Corporation, Armonk, NY (US)

(72) Inventors: Sweta Singh, Bangalore (IN); Renu P. Sumam, Banglaore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/892,156

(22) Filed: May 10, 2013

(65) Prior Publication Data

US 2013/0297587 A1    Nov. 7, 2013

Related U.S. Application Data

(63) Continuation of application No. 13/465,769, filed on May 7, 2012.

(51) Int. Cl.
*G06F 7/00* (2006.01)
(52) U.S. Cl.
USPC .......................................................... 707/719
(58) Field of Classification Search
USPC .......................................................... 707/719
See application file for complete search history.

(56) References Cited

U.S. PATENT DOCUMENTS

| 6,789,071 B1 | 9/2004 | Kapoor et al. |
|---|---|---|
| 6,983,275 B2 | 1/2006 | Koo et al. |
| 7,693,820 B2 | 4/2010 | Larson et al. |
| 7,877,374 B2 | 1/2011 | Zabback et al. |
| 7,930,277 B2 | 4/2011 | Ge et al. |
| 7,945,557 B2 | 5/2011 | Cheng et al. |
| 2004/0220896 A1 | 11/2004 | Finlay et al. |
| 2005/0210023 A1 | 9/2005 | Barrera et al. |
| 2007/0067262 A1 | 3/2007 | Ramesh et al. |
| 2007/0299836 A1 | 12/2007 | Hou et al. |

(Continued)

FOREIGN PATENT DOCUMENTS

| CN | 101093493 | 12/2007 |
|---|---|---|
| CN | 101963993 | 2/2011 |

OTHER PUBLICATIONS

Chen, D., R. Chirkova, and F. Sadri, "Query Optimization Using Restructured Views: Theory and Experiments", [online], [Received Mar. 29, 2007; Revised Dec. 31, 2007; Accepted Oct. 1, 2008; Issued Nov. 5, 2008]. Retrieved from the Internet at <URL: http://www.sciencedirect.com/science/article/pii/S030643790800080X>, Total 36 pp.

(Continued)

*Primary Examiner* — Truong Vo
(74) *Attorney, Agent, or Firm* — Janaki K. Davda; Konrad, Raynes, Davda & Victor LLP (57) ABSTRACT

Provided are a computer implemented method, computer program product, and system for re-writing a query. A query including a query predicate is received. It is determined that the query predicate includes one column with an associated predicate mapper. An equivalent predicate is generated for the query predicate using the predicate mapper that provides a mapping from the one column to another column. A cost of the query with the equivalent predicate is evaluated. In response to determining that the cost of the query is optimal, the query is rewritten to replace the query predicate with the equivalent predicate.

21 Claims, 11 Drawing Sheets

(56) References Cited

U.S. PATENT DOCUMENTS

2008/0059410 A1 3/2008 Bhattacharjee et al.
2009/0094216 A1 4/2009 Hou et al.
2010/0030728 A1* 2/2010 Chakkappen et al. ............ 707/2
2011/0082856 A1 4/2011 Subbiah et al.

OTHER PUBLICATIONS

U.S. Appl. No. 13/465,769, filed May 7, 2012, entitled "Optimizing Queries Using Predicate Mappers", invented by Singh, S. and R.P. Sumam, Total 35 pp.
US Publication No. 2007/0299836, dated Dec. 27, 2007, is an English language equivalent of CN101093493, dated Dec. 26, 2007.
US Publication No. 2009/0094216, dated Apr. 9, 2009, is an English language equivalent of CN101093493, dated Dec. 26, 2007.
International Search Report and Written Opinion for International Application No. PCT/IB2013/053489, dated May 2, 2013, 10 pp.
Office Action 1, dated May 10, 2013, for U.S. Appl. No. 13/465,769, 15 pp.
Response to Office Action 1, dated Aug. 6, 2013, for U.S. Appl. No. 13/465,769, 10 pp.
Final Office Action 1, dated Aug. 16, 2013, for U.S. Appl. No. 13/465,769, 15 pp.
Response to Final Office Action 1, dated Nov. 14, 2013, for U.S. Appl. No. 13/465,769, 8 pp.
Notice of Allowance for U.S. Appl. No. 13/465,769, dated Dec. 11, 2013, 16 pp.
Corrected Notice of Allowance, dated Dec. 23, 2013, for U.S. Appl. No. 13/465,769, 6 pp.

* cited by examiner

OPTIMIZING QUERIES USING PREDICATE MAPPERS

CROSS-REFERENCE TO RELATED APPLICATION

This patent application is a continuation of U.S. patent application Ser. No. 13/465,769, filed May 7, 2012, which patent application is incorporated herein by reference in its entirety.

FIELD

Embodiments of the invention relate to optimizing queries using predicate mappers. Embodiments optimize certain queries by deriving an inverse mapping from a generated column to a base column.

BACKGROUND

Relational DataBase Management System (RDBMS) software may use a Structured Query Language (SQL) interface. A RDBMS uses relational techniques for storing and retrieving data in a relational database. Relational databases are organized into tables that consist of rows and columns of data. The rows may be called tuples or records or rows. A database typically has many tables, and each table typically has multiple records and multiple columns.

A table in a database can be accessed using an index. An index is an ordered set of references (e.g., pointers) to the records in the table. The index is used to access each record in the table using a key (i.e., one of the fields or attributes of the record, which corresponds to a column). The term "key" may also be referred to as "index key". Without an index, finding a record requires a scan (e.g., linearly) of an entire table. Indexes provide an alternate technique to accessing data in a table. Users can create indexes on a table after the table is built. An index is based on one or more columns of the table.

A query may be described as a request for information from a database based on specific conditions. A query typically includes one or more predicates. A predicate may be described as an element of a search condition that expresses or implies a comparison operation (e.g., A=3).

Generated columns in relational database tables are used to store pre-computed values. A generated column is used by a query optimizer to replace expressions in a query that are equivalent to the generated column's expression. However, there are several cases in which the generated column is used to store a user-friendly format of underlying data and is used directly in application queries. For example, the generated column may be a zero-padded string representation of an integer base column. Although integer comparisons are faster than string comparisons, string comparisons would be performed on the zero-padded string representation.

SUMMARY

Provided are a computer implemented method, computer program product, and system for re-writing a query. A query including a query predicate is received. It is determined that the query predicate includes one column with an associated predicate mapper. An equivalent predicate is generated for the query predicate using the predicate mapper that provides a mapping from the one column to another column. A cost of the query with the equivalent predicate is evaluated. In response to determining that the cost of the query is optimal, the query is rewritten to replace the query predicate with the equivalent predicate.

BRIEF DESCRIPTION OF THE SEVERAL VIEWS OF THE DRAWINGS

In the drawings, like reference numbers represent corresponding parts throughout.

FIG. 2 is formed by FIGS. 2A and 2B.

FIG. 3 is formed by FIGS. 3A and 3B.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
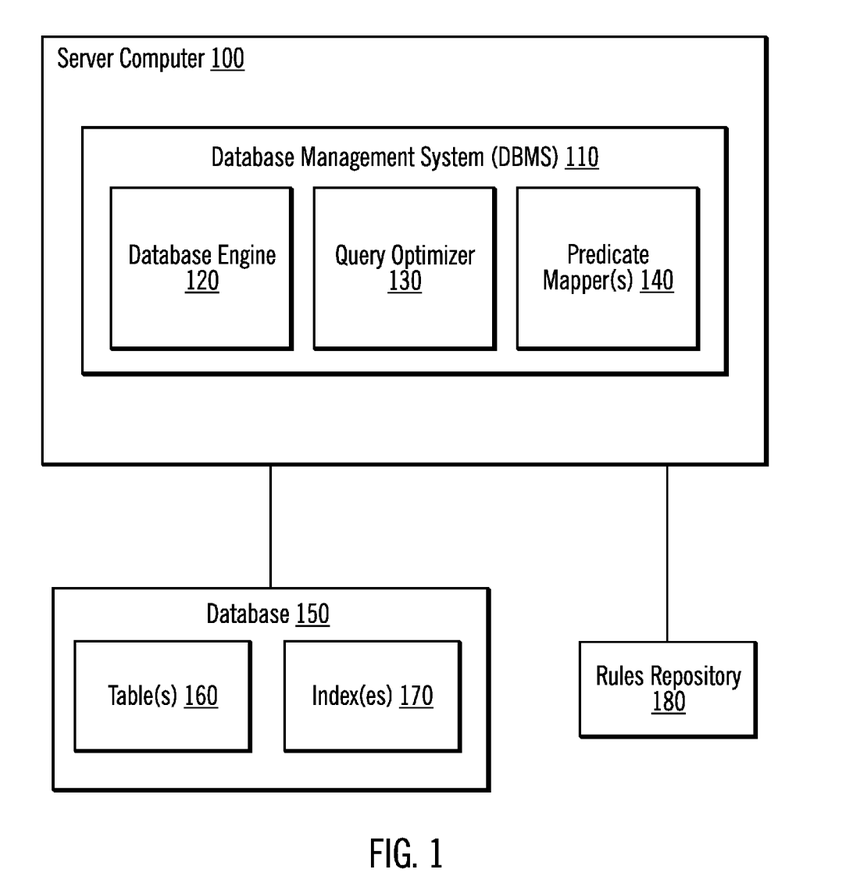
FIG. 1 illustrates, in a block diagram, a computing environment in accordance with certain embodiments.

FIG. 1 illustrates, in a block diagram, a computing environment in accordance with certain embodiments. A server computer 100 is coupled to a database 150 and to a rules repository 180. The server computer 100 includes a Database Management System (DBMS) 110. The DBMS includes a database engine 120, a query optimizer 130 and one or more predicate mappers 140. The database stores one or more tables 160 and one or more indexes 170. The rules repository 180 maps a function to its inverse to generate an inverse function.

In certain embodiments, the predicate mapper 140 creates a mapping from one column to one or more other columns. In certain embodiments, one column and another column are from the same table. In certain additional embodiments, the another column is a generated column. In certain embodiments, there is a relationship between one column and another column that is complex and cannot be expressed as a generated column expression; in such cases, techniques, such as a database trigger, are used to encapsulate the operations to generate the other column. In certain embodiments, the predicate mapper 140 creates a mapping from a generated column to one or more base columns. The query optimizer 130 leverages the predicate mappers 140 to rewrite a query.

In certain embodiments, a user creates the predicate mapper 140 to define a mapping from one column to another column. Such a user created predicate mapper 140 is made available to the database engine 120. In certain alternative embodiments, such as when a query predicate includes a generated column, the database engine 120 creates the predicate mapper 140.

Figure 2A:
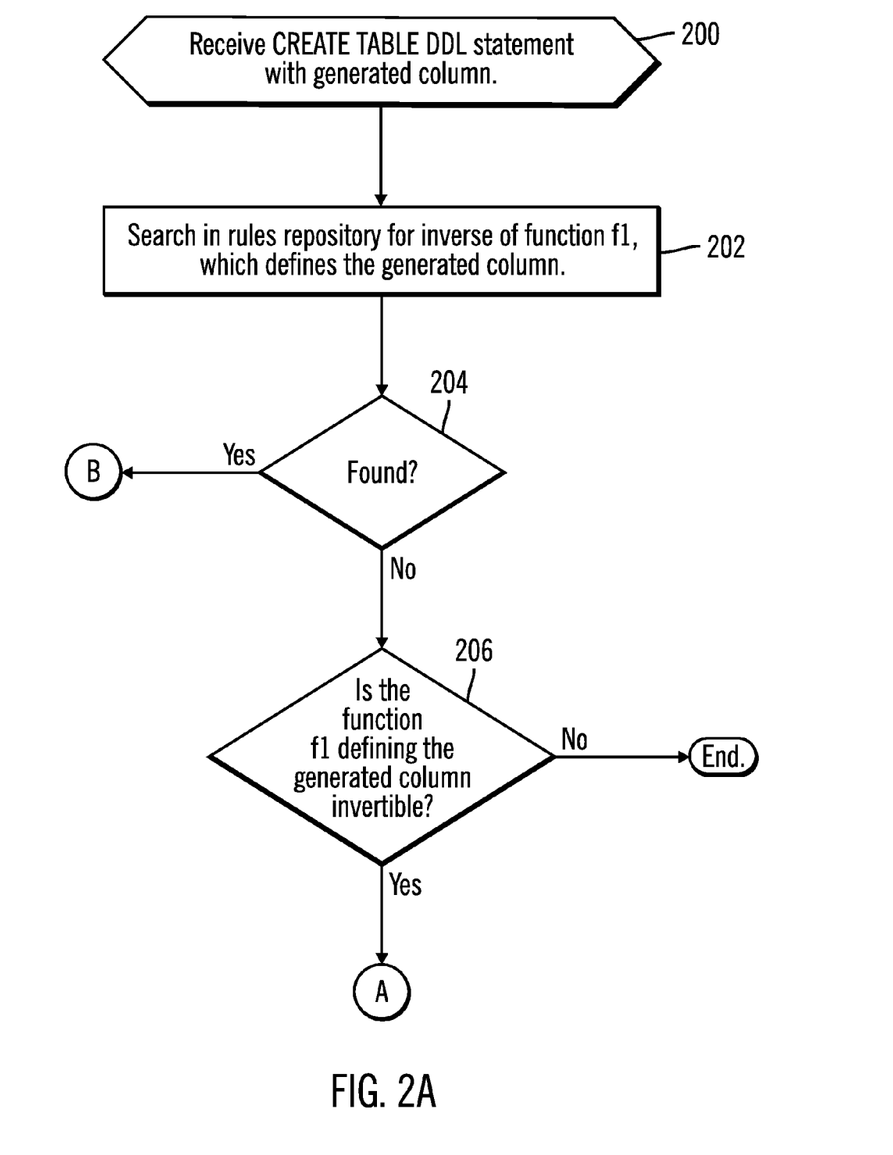
FIG. 2 illustrates, in a flow diagram, operations for creating a predicate mapper via auto-detection in accordance with certain embodiments.
Figure 2B:
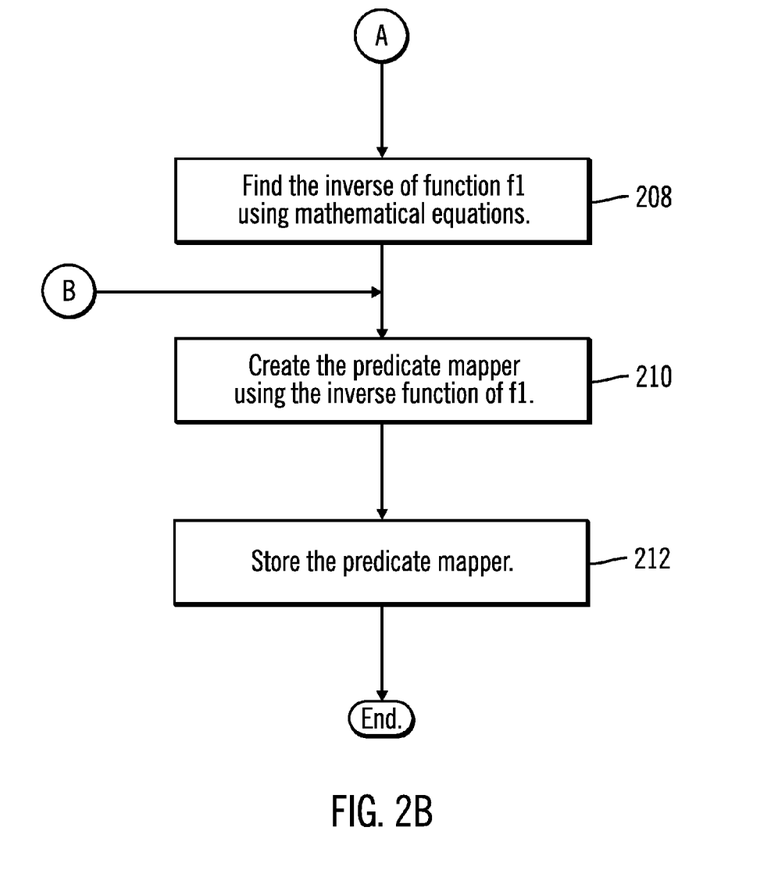

FIG. 2 illustrates, in a flow diagram, operations for creating a predicate mapper via auto-detection in accordance with certain embodiments. FIG. 2 is formed by FIGS. 2A and 2B. At the time of table creation, the database engine 120 detects the presence of generated columns and extracts the functions defining the generated columns. The rules repository 180 describes commonly used functions and their reverse mapping. The processing of FIG. 2 is performed for each generated column.

Intelligence is built into the DBMS 110, so that when the user provides a CREATE TABLE statement and the CREATE TABLE statement has a generated column, the database engine 120 tries to generate the inverse of a function, which defines the generated column. This will hold true for numerical columns, where a mathematical function defines the generated column. Thus, the database engine creates a system generated predicate mapper 140.

In FIG. 2, control begins at block 200 with the database engine 120 receiving a "CREATE TABLE" Data Description Language (DDL) statement with a generated column. Embodiments build logic into the database engine 120 such that, whenever the user issues a CREATE TABLE DDL statement that has a generated column definition, the database engine 120 tries to find the inverse function and generate a predicate mapper 140 using this inverse function.

As an example, the following CREATE TABLE statement has a generated column, col2. As part of auto-detection, the DBMS 110 tries to determine whether the relationship between Col2 and Col1 is one-on-one and if yes, tries to generate the inverse of Col2 and creates a predicate mapper 140.

```
CREATE TABLE T1
(
Col1 integer,
Col2 integer generated always as (col1+10)/2)
)
```

In block 202, the database engine 120 searches in the rules repository 180 for the inverse of function f1, which defines the generated column. In certain embodiments, the rules repository 180 stores well known/proven mathematical functions and their inverse functions. If the generated column matches an existing function in the rules repository 180, then the inverse function can be used from the rules repository itself, without having to go through the process of generating the inverse function. Some examples of well established functions and inverses are:

| Function f(x) | Inverse |
|---|---|
| X + a | y − a |
| a − x | a − y |

In block 204, the database engine 120 determines whether the inverse of function f1 was found. If so, processing continues from block 204 (FIG. 2A) to block 210 (FIG. 2B), otherwise, processing continues to block 206.

In block 206, the database engine 120 determines whether the function f1 defining the generated column is invertible. In certain embodiments, this determination is made by using induction to determine whether the function f1 is one-on-one. If function f1 is invertible, processing continues from block 206 (FIG. 2A) to block 208 (FIG. 2B), otherwise, processing is done. One-on-one may be described as mathematical terminology. Not all functions have an inverse. A function is invertible if and only if each element in the generated column set corresponds to a unique value in a base column. So, the database engine 120 checks whether the function defining the generated column satisfies this condition before generating an inverse function. This may be determined using mathematical induction.

In block 208, the database engine 120 finds the inverse of function f1 using mathematical equations. In block 210, the database engine 120 generates the predicate mapper using the inverse of function f1. In block 212, the database engine 120 stores the predicate mapper (e.g., in a system catalog).

The following is an example of how the inverse function can be derived for a function gen_col defining the generated column as follows:

gen_col=(base_col+10)/2

The database engine 120 determines that the function gen col is invertible since the function is one-on-one. The following pseudocode represents the processing performed by the database engine 120 to mathematically find the inverse of the function gen_col:

```
Rewrite the function as: y = ( x + 10 ) / 2
Multiply both sides by the denominator : 2y = x+10
Bring all terms involving x to the Left Hand Side (LHS) and other
    terms to the Right Hand Side (RHS): x = 2y − 10
Solving for x: x= 2y − 10
```

Then, the database engine 120 determines that the inverse of function gen_col is:

(2*gen_col−10)

In cases in which the mapping from the generated column to the one or more base columns involves complex logic, the user can explicitly create the predicate mapper 140. The database engine 120 uses this predicate mapper for predicate replacement during query transformation.

Figure 3A:
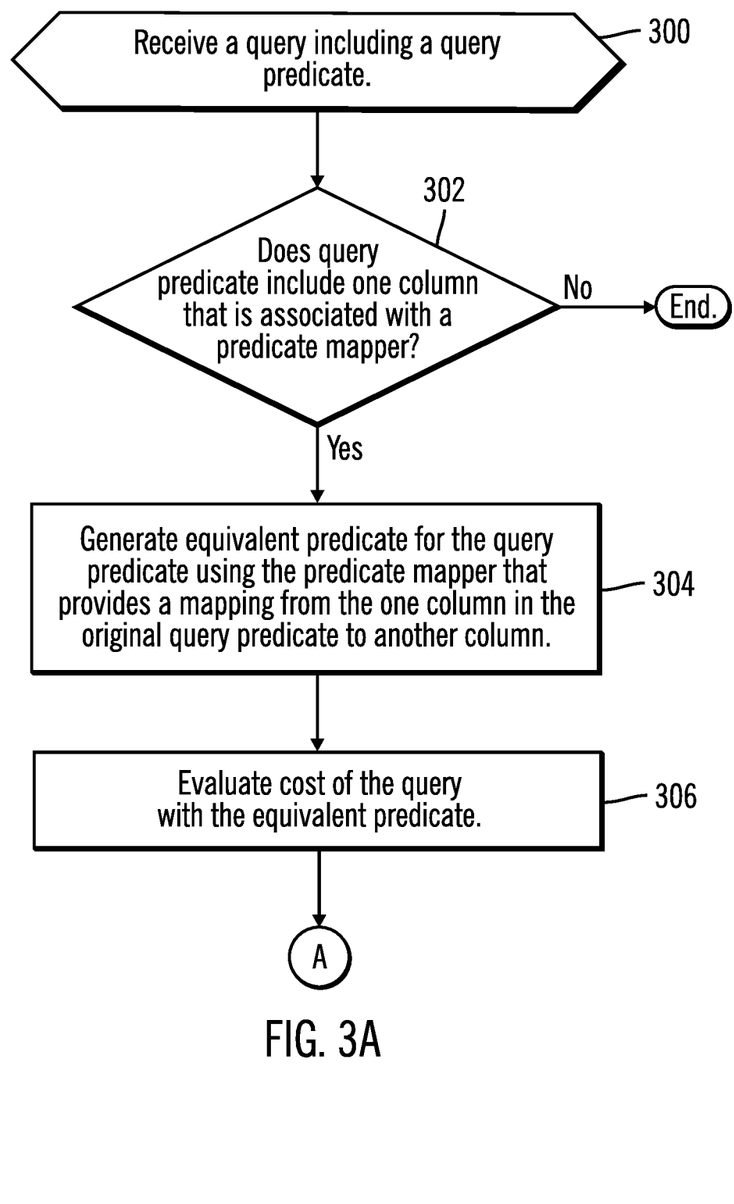
FIG. 3 illustrates, in a flow diagram, operations for query transformation in accordance with certain embodiments.
Figure 3B:
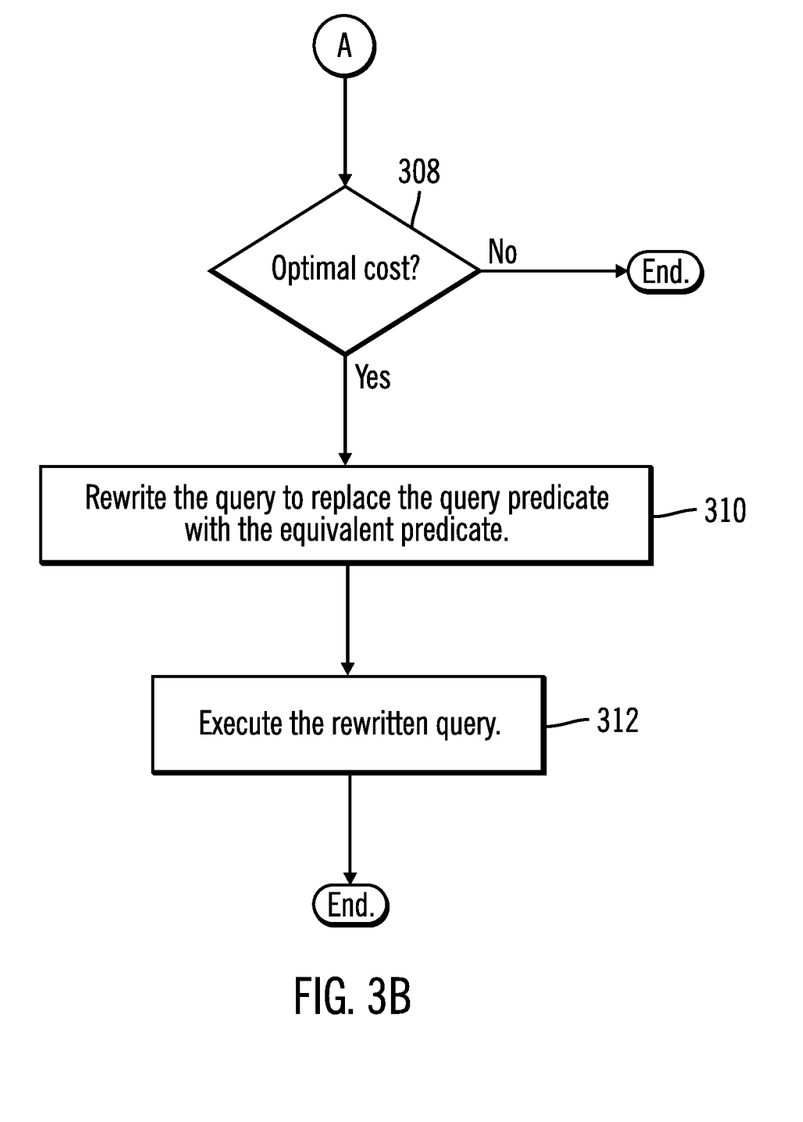

FIG. 3 illustrates, in a flow diagram, operations for query transformation in accordance with certain embodiments. FIG. 3 is formed by FIGS. 3A and 3B. In certain embodiments, the operations of FIG. 3 represent query transformation logic to be applied during the query re-write phase of query optimization. In certain embodiments, when a query is submitted to the database engine 120, the query optimizer 130 identifies any predicates in the query that include generated columns and attempts to optimize the query by query re-write.

In FIG. 3, control begins at block 300 with the query optimizer 130 receiving a query including a query predicate. In block 302, the query optimizer 130 determines whether the query predicate includes one column that is associated with a predicate mapper. If so, processing continues to block 304, otherwise, processing ends. The query predicate may be described as an original query predicate, and the one column is the column in the original query predicate. In certain embodiments, the column is a generated column, and the query optimizer 130 determines whether a predicate mapper exists for the generated column (i.e., the query optimizer 130 checks whether the generated column has a predicate mapper associated with it).

In block 304, the query optimizer 130 generates an equivalent predicate for the query predicate using the predicate mapper that provides a mapping from the one column in the original query predicate to another column. In certain embodiments, the query optimizer 130 generates the equivalent predicate, in which the Left Hand Side (LHS) is the base column and the Right Hand Side (RHS) is a value returned by the predicate mapper. In particular, based on the details provided in the predicate mapper, an equivalent predicate using the one or more base columns is generated. In block 306, the query optimizer 130 evaluates the cost of the query using the equivalent predicate. From block 306 (FIG. 3A), processing continues to block 308 (FIG. 3B). In block 308, the query optimizer 130 determines whether the cost is optimal. If so, processing continues to block 310, otherwise, processing ends. The query optimizer 130 is cost based (where cost maps to time taken to run a query), and the cost includes the processing cost and the Input/Output (I/O) cost. In certain embodiments, optimal cost of the query using the equivalent predicate refers to a cost that is less than the cost of the query without using the equivalent predicate (i.e., the original query). If the query optimizer 130 replaces the original predicate with equivalent predicate using the function mapper, and the cost with the equivalent predicate is less, then the equivalent predicate is used.

In block 310, the query optimizer 130 re-writes the query to replace the query predicate with the equivalent predicate. In block 312, the database engine 120 executes the rewritten query.

The query optimizer 130 and predicate mappers 140 are applied on a wide range of optimization scenarios including comparisons using a more efficient data type (numeric v/s string), decomposing a predicate to restrict the scan range, and index usage. The query optimizer 130 performs a reverse mapping from a generated column to one or more base columns. Since the mapping is reverse, there is processing logic in the database engine 120 that tries to implicitly map the generated column to the one or more base columns.

Merely to enhance understanding, various examples are provided herein.

In a Customer Scenario 1, a unique ID is an integer data, but the unique ID is represented as a string padded with zeros to have a uniform, fixed-length representation. The string representation is a generated column based on the integer value. The string representation is made known to applications/users and is used in queries. However, in this example, the customer wants to use the integer column during query processing for performance advantage. The following is an example table "TAB1", with an example query, and a rewritten query:

Example table:
  TAB1 with columns uid integer, and Unique_id is a varchar column
  generated as Unique_Id=lpad(uid, 6, '0')
  Example query:
  select * from tab1 where Unique_Id='000012011'
  Rewritten query:
  select * from tab1 where uid=12011

In a Customer Scenario 2, an integer value is used in hexadecimal ("hex") value format, stored as string. The applications use the hex format in the queries, however, integer comparisons yield better performance results. The following is an example table "TAB2", with an example query, and a rewritten query:

Example table:
  TAB2 with columns cid integer, and CUST_ID is a
  varchar column generated as CUST_ID=hex(cid)
  Example query:
  select * from tab2 where CUST_ID=0x'94A'
  Rewritten query:
  select * from tab2 where cid=2378

Customer Scenario 3 is a banking example in which a customer's unique account identifier (ID) is a composition of several components (such as region code, branch code, and a serial number) and is represented as a generated column. When the number of customers is very large, and the number of distinct regions and branches are very small in comparison, decomposing the predicate on the account_id into predicates on the components involve scanning fewer pages and improve query performance. The following is an example table "TAB3", with an example query, and a rewritten query:

Example table:
  TAB3 with columns rc char(2), bc char(3), slno integer,
  and ACCOUNT_ID is a varchar column generated
  as ACCOUNT_ID=concat(rc,bc,slno )
  Sample query:
  select * from tab3 where ACCOUNT_ID='112221234'
  Rewritten query:
  select * from tab3 where rc='11' and bc='222' and slno=1234

In Customer Scenario 4, a result of a complex function on the base column is stored as a generated column, and an index is defined on the base column. Here, if the user provides a predicate with the generated column, embodiments rewrite the predicate using the base column and leveraging the index defined on the base column. The following is an example table "TAB4", with an example query, and a rewritten query:

Example table:
  TAB4 with columns sales that has an index on it and BONUS
  that is generated as 0.2*sales + 10000
  Sample query:
  select * from tab4 where BONUS>20000
  Rewritten query:
  select * from tab4 where sales > 50000

The predicate mapper 140 may be described as a new schema object that maps a generated column in the table to one or more base columns. The predicate mapper may be generated by the database engine 120 or may be defined explicitly by the user using a Data Description Language (DDL) statement. The predicate mapper 140 may be used to define a relationship among any columns (e.g., a relationship based on a generated column).

Certain embodiments use the following syntax for creating a predicate mapper:

CREATE PREDICATE MAPPER UIDPMap
FOR uid TO flag, nuid ON uid_master
RETURN NEWRHS =
( substr(OLDRHS, 1,1), INT(substr(OLDRHS,2,11))

Figure 4:
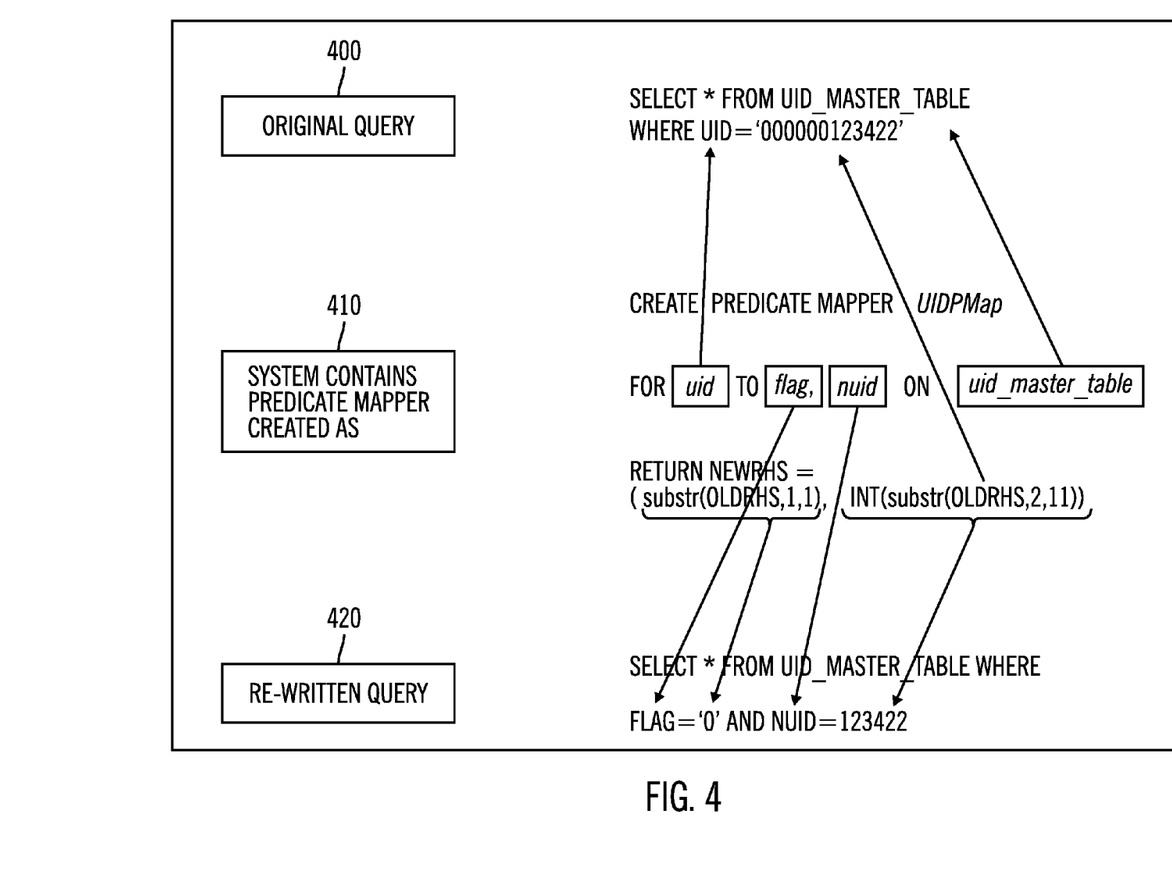
FIG. 4 illustrates use of a predicate mapper in accordance with certain embodiments.
Figure 5:
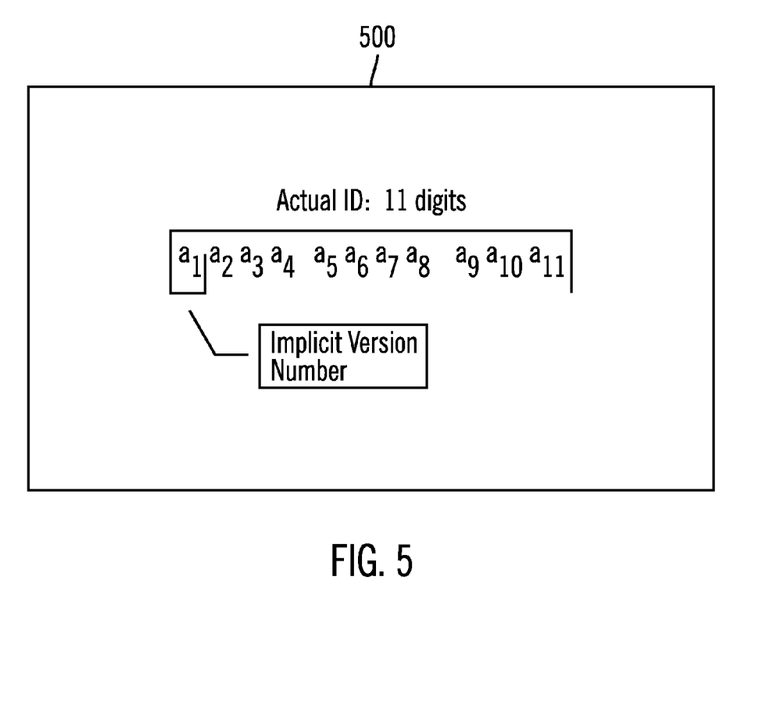
FIG. 5 illustrates an example User Identification (UID) in accordance with certain embodiments.

FIG. 4 illustrates use of a predicate mapper in accordance with certain embodiments. An original query 400 is rewritten as query 420 using the predicate mapper created with the create statement 410.

Certain embodiments use the following syntax for a creating a user-defined predicate mapper:

```
CREATE PREDICATE MAPPER
    <name>
    FOR <src_gen_col>
    [ TO <base col1>, <base_col2>, <base_col3>,...]
    ON <table_name>
    RETURN NEWRHS = ( function 1(OLDRHS) ,
[function2(OLDRHS), function3(OLDRHS),...] );
    where:
    <name> identifies a predicate mapper object
    <src_gen_col> is a name of a generated column
    <base_col1>,<base_col2>,<base_col3>,... is a list of one or more
base columns on which the generated column is defined. This is optional.
If not provided, the database engine 120 implicitly derives the list of one
or more base columns in the order they appear in the definition of the
generated column.
    <table_name> is a table that has the generated column
    NEWRHS is a keyword that will contain the RHS value for the
    new predicate
    OLDRHS is a keyword that will contain the RHS value of the
    old predicate
    function1, function2, function3 ... are in-built or user-defined
    functions
```

The following is an example of creating a predicate mapper for the Customer Scenario 1, in which an in-built function INT is used to find the new predicate's RHS:

```
CREATE PREDICATE MAPPER pmap1 FOR unique_id ON tab1
RETURN NEWRHS = INT(OLDRHS)
```

With this predicate mapper definition, the database engine 120 replaces the predicate unique_id='000012210' with the predicate uid=12210.

The following is an example of creating a predicate mapper for the Customer Scenario 2, in which a user-defined function hex_to_dec is used to find the new predicate's RHS:

```
CREATE PREDICATE MAPPER pmap2 FOR cust_id ON tab2
RETURN NEWRHS = hex_to_dec(OLDRHS)
```

With this predicate mapper, the database engine 120 replaces the predicate cust_id=x'264A' with the predicate cid=9802.

The following is an example of creating a predicate mapper for the Customer Scenario 3, in which an in-built function substr is used to return a list of values, one for each base column:

```
CREATE PREDICATE MAPPER pmap3 FOR account_id TO rc, bc,
slno ON tab3
RETURN NEWRHS = ( substr(OLDRHS,1,2), substr(OLDRHS,3,3),
substr(OLDRHS,6,4) )
```

With this predicate mapper, the database engine 120 replaces the predicate account_id="112221234" with the predicate rc='11' and bc='222' and slno='1234'.

Figure 6:
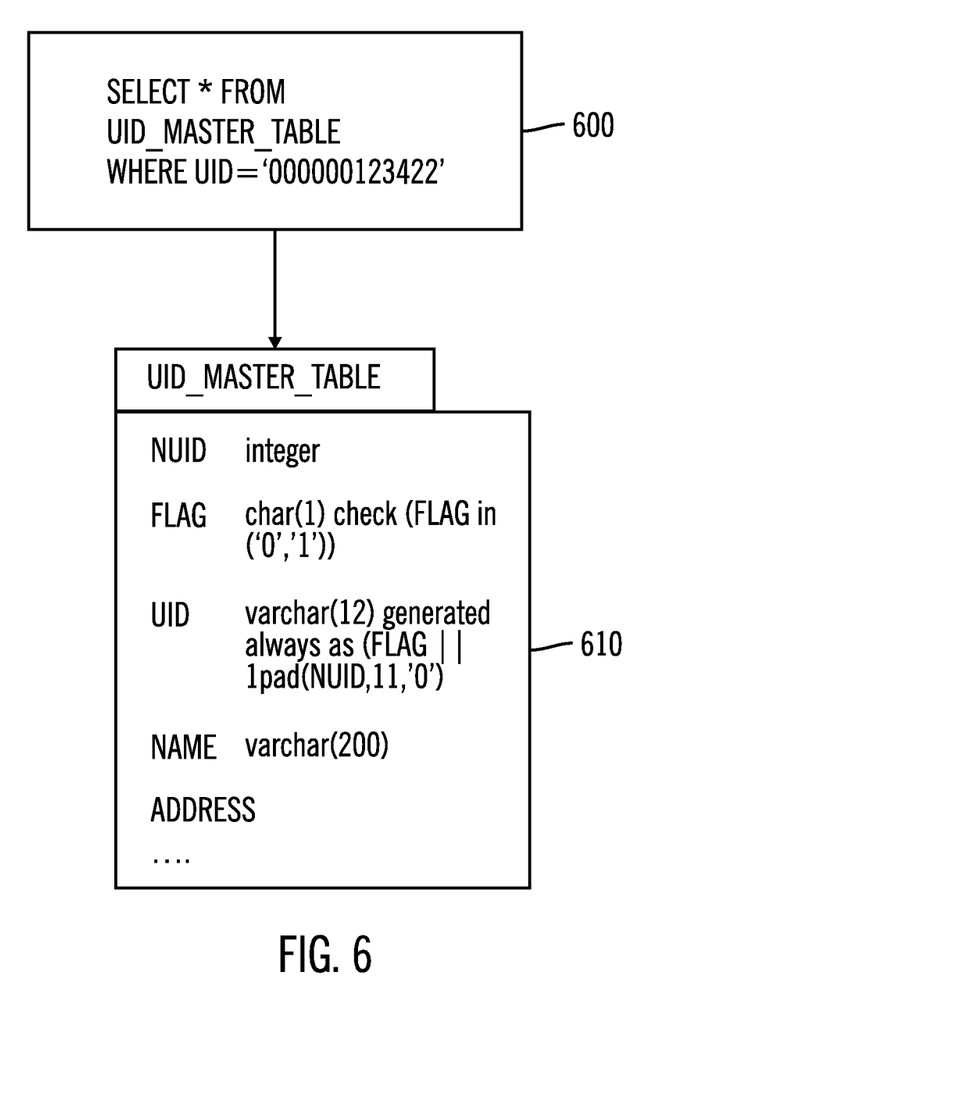
FIG. 6 illustrates an example select statement issued against a master UID table in accordance with certain embodiments.
Figure 7:
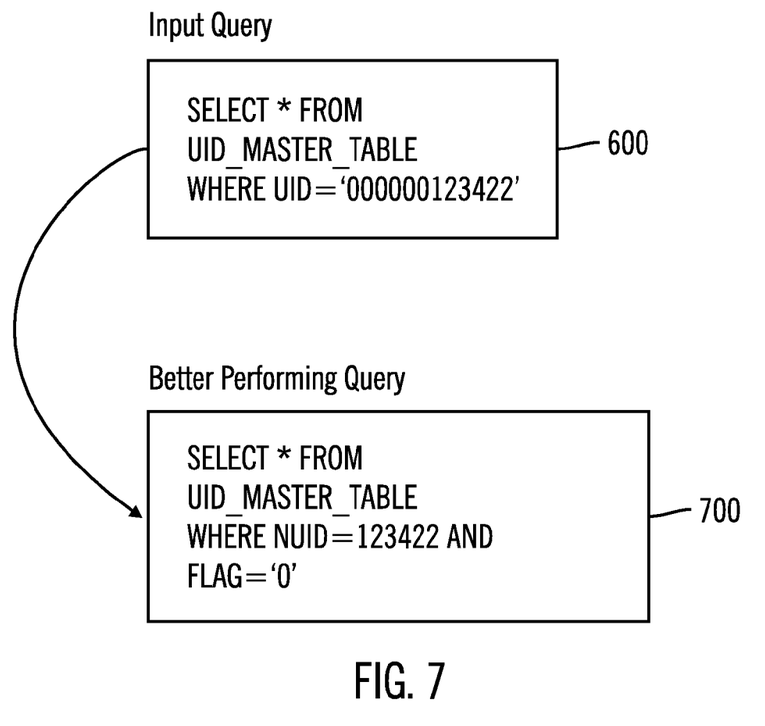
FIG. 7 illustrates an input query and an optimized query in accordance with certain embodiments.
Figure 8:
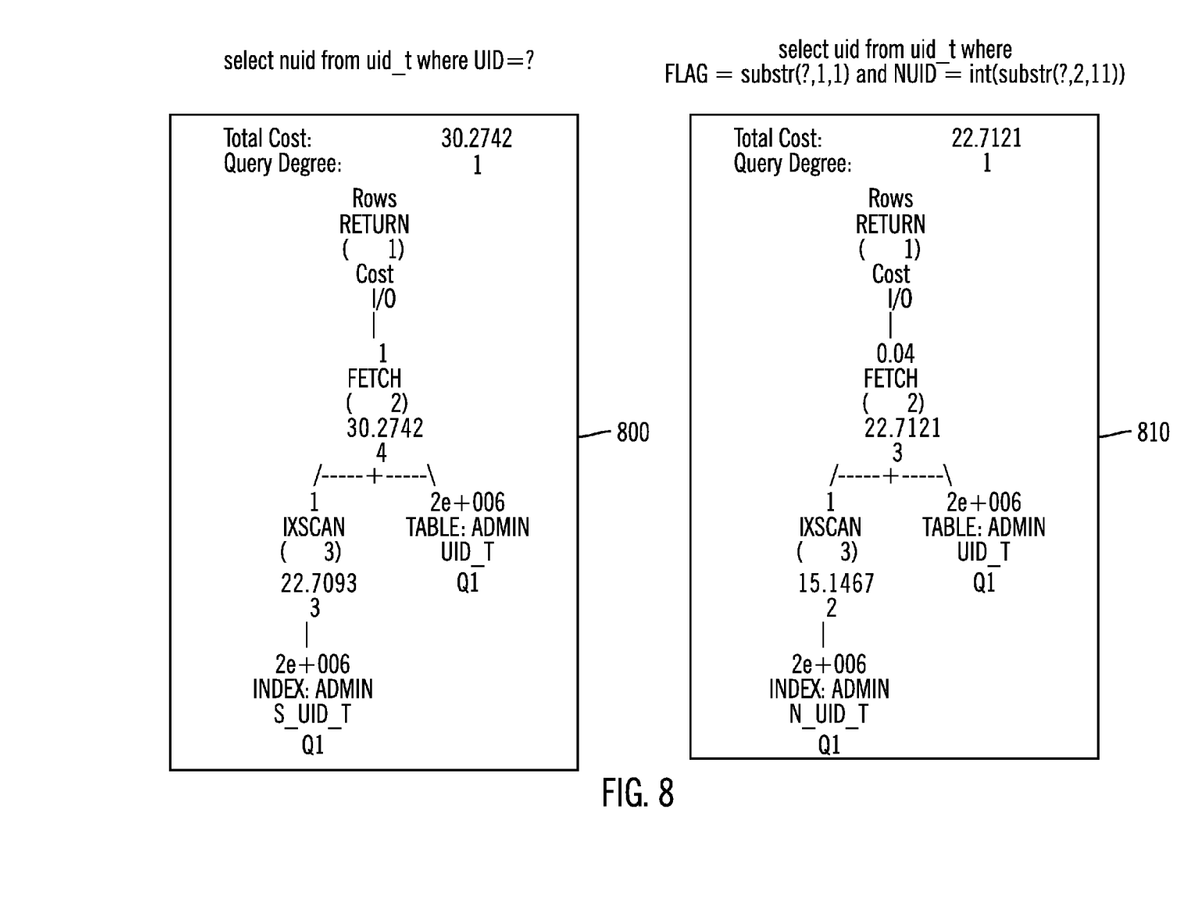
FIG. 8 illustrates access plan comparisons in accordance with certain embodiments.

Certain embodiments are applicable to a User Identification (UID) in which the UID is a number that does not include alphabet characters (since a specific alphabet brings dependency to a specific script/language and literacy). In certain embodiments, 12 decimal digits are used for the UID. The Version Number: $a_1=0$ represents individuals, while $a_1=1$ represents entities, etc. If 2-9 numbers ($a_1=2, 3 \ldots 9$) were used to assign UIDs, that is 80 billion numbers. The UID may be a number padded with zeroes to make $a_2 \ldots a_{11}$ fixed length. In certain embodiments, UID Authentication is an operation with a stringent response time requirement. FIG. 6 illustrates an example select statement 600 issued against a master UID table 610 in accordance with certain embodiments. In the master UID table 610, the UID is varchar. FIG. 7 illustrates an input query 600 and an optimized query 700 in accordance with certain embodiments. FIG. 8 illustrates access plan comparisons in accordance with certain embodiments. In particular, the access plan 800 for the input query 600 is compared to the access plan 810 for the optimized query 700 to show a 25% improvement in cost. Lower cost translates to faster query execution time.

Embodiments extend SQL to support a new schema object called a predicate mapper that provides the mapping from a generated column to a base column. Also, with embodiments, the query optimizer 130 re-writes the query to achieve better performance.

Embodiments optimize queries by deriving an inverse mapping in a database by: extending SQL to create a new schema object called a predicate mapper for providing a mapping from a generated column to a base column. Embodiments receive a query for the database engine 120 and determine whether a predicate in a query includes the generated column and, if so, generate an equivalent predicate using the base column(s) and the details provided in the predicate mapper associated with the column. Embodiments evaluate the cost of query using the equivalent predicate and leverage predicate mappers during the query re-write phase to generate an alternative predicate, evaluate the cost of the alternative predicate, and determine the best performing query execution plan based on the cost. Embodiments generate predicate mappers via auto detection and based on inverse functions associated with the columns.

Embodiments re-write queries to leverage generated columns. Embodiments obtain the relationship between columns from a user using a DDL and have the query optimizer 130 use that information to come up with a better query plan. Embodiments enable the query processor to know that using an alternative but equivalent predicate on the base column may prove to be more efficient.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 9:
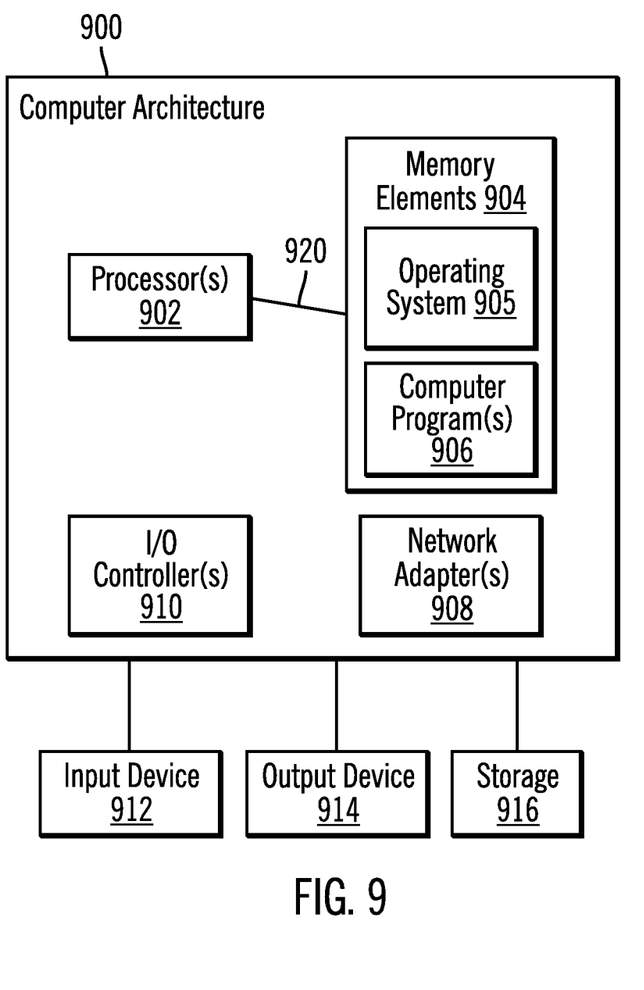
FIG. 9 illustrates, in a block diagram, a computer architecture that may be used in accordance with certain embodiments.

FIG. 9 illustrates a computer architecture 900 that may be used in accordance with certain embodiments. Server computer 100 may implement computer architecture 900. The computer architecture 900 is suitable for storing and/or executing program code and includes at least one processor 902 coupled directly or indirectly to memory elements 904 through a system bus 920. The memory elements 904 may include local memory employed during actual execution of the program code, bulk storage, and cache memories which provide temporary storage of at least some program code in order to reduce the number of times code must be retrieved from bulk storage during execution. The memory elements 904 include an operating system 905 and one or more computer programs 906.

Input/Output (I/O) devices 912, 914 (including but not limited to keyboards, displays, pointing devices, etc.) may be coupled to the system either directly or through intervening I/O controllers 910.

Network adapters 908 may also be coupled to the system to enable the data processing system to become coupled to other data processing systems or remote printers or storage devices through intervening private or public networks. Modems, cable modem and Ethernet cards are just a few of the currently available types of network adapters 908.

The computer architecture 900 may be coupled to storage 916 (e.g., any type of storage device; a non-volatile storage area, such as magnetic disk drives, optical disk drives, a tape drive, etc.). The storage 916 may comprise an internal storage device or an attached or network accessible storage. Computer programs 906 in storage 916 may be loaded into the memory elements 904 and executed by a processor 902 in a manner known in the art.

The computer architecture 900 may include fewer components than illustrated, additional components not illustrated herein, or some combination of the components illustrated and additional components. The computer architecture 900 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for re-writing a query, comprising:
receiving, with a processor of a computer, a query including a query predicate that includes a generated column with a mathematical function that references a base column and the generated column; and
in response to determining that the base column and the generated column have a one-on-one relationship,
generating an inverse function for the mathematical function that uses the base column and the generated column;
creating a predicate mapper using the inverse function;
generating an equivalent predicate for the query predicate using the predicate mapper that sets the base column equal to a value returned by the predicate mapper; and
in response to determining that a cost of the query with the equivalent predicate is optimal, re-writing the query to replace the query predicate with the equivalent predicate.

2. The method of claim 1, further comprising:
locating an inverse function for the mathematical function that defines the generated column in a rules repository; and
creating the predicate mapper using the located inverse function.

3. The method of claim 1, further comprising:
determining that the mathematical function is invertible; and
finding the inverse function for the mathematical function using mathematical equations.

4. The method of claim 3, wherein
the mathematical function is invertible if each element in a generated column set corresponds to a unique value in a base column set.

5. The method of claim 1, wherein the predicate mapper comprises a schema object.

6. The method of claim 1, wherein the predicate mapper is created by a user.

7. The method of claim 1, wherein the predicate mapper is created by a database engine.

8. A computer program product for re-writing a query, the computer program product comprising:
a computer readable storage medium having computer readable program code embodied therein, wherein the computer readable program code, when executed by a processor of a computer, is configured to perform operations of:
receiving a query including a query predicate that includes a generated column with a mathematical function that references a base column and the generated column; and
in response to determining that the base column and the generated column have a one-on-one relationship,
generating an inverse function for the mathematical function that uses the base column and the generated column;
creating a predicate mapper using the inverse function;
generating an equivalent predicate for the query predicate using the predicate mapper that sets the base column equal to a value returned by the predicate mapper; and
in response to determining that a cost of the query with the equivalent predicate is optimal, re-writing the query to replace the query predicate with the equivalent predicate.

9. The computer program product of claim 8, wherein the computer readable program code, when executed by the processor of the computer, is configured to perform operations of:
locating an inverse function for the mathematical function in a rules repository; and
creating the predicate mapper using the located inverse function.

10. The computer program product of claim 8, wherein the computer readable program code, when executed by the processor of the computer, is configured to perform operations of:
determining that the mathematical function is invertible; and
finding the inverse function for the mathematical function using mathematical equations.

11. The computer program product of claim 10, wherein the mathematical function is invertible if each element in a generated column set corresponds to a unique value in a base column set.

12. The computer program product of claim 8, wherein the predicate mapper comprises a schema object.

13. The computer program product of claim 8, wherein the predicate mapper is created by a user.

14. The computer program product of claim 8, wherein the predicate mapper is created by a database engine.

15. A computer system for re-writing a query, comprising:
a processor; and
a storage device coupled to the processor, wherein the storage device has stored thereon a program, and wherein the processor is configured to execute instructions of the program to perform operations, wherein the operations comprise:
receiving a query including a query predicate that includes a generated column with a mathematical function that references a base column and the generated column; and
in response to determining that the base column and the generated column have a one-on-one relationship,
generating an inverse function for the mathematical function that uses the base column and the generated column;
creating a predicate mapper using the inverse function;
generating an equivalent predicate for the query predicate using the predicate mapper that sets the base column equal to a value returned by the predicate mapper; and
in response to determining that a cost of the query with the equivalent predicate is optimal, re-writing the query to replace the query predicate with the equivalent predicate.

16. The computer system of claim 15, wherein the operations further comprise:
locating an inverse function for the mathematical function in a rules repository; and
creating the predicate mapper using the located inverse function.

17. The computer system of claim 15, wherein the operations further comprise:
determining that the mathematical function is invertible; and
finding the inverse function for the mathematical function using mathematical equations.

18. The computer system of claim 17, wherein the mathematical function is invertible if each element in a generated column set corresponds to a unique value in a base column set.

19. The computer system of claim 15, wherein the predicate mapper comprises a schema object.

20. The computer system of claim 15, wherein the predicate mapper is created by a user.

21. The computer system of claim 15, wherein the predicate mapper is created by a database engine.

* * * * *